June 8, 1965 L. M. MORRISH ETAL 3,188,115
FLEXIBLE EXHAUST COUPLING INCLUDING A HEAT DISSIPABLE WASHER
Filed Aug. 4, 1958

INVENTORS
Leonard M. Morrish &
William D. Pittsley
BY L. D. Burch
ATTORNEY

# United States Patent Office 3,188,115
Patented June 8, 1965

3,188,115
FLEXIBLE EXHAUST COUPLING INCLUDING A HEAT DISSIPABLE WASHER
Leonard M. Morrish and William D. Pittsley, Flint, Mich., assignors to General Motors Corporation, Detroit, Mich., a corporation of Delaware
Filed Aug. 4, 1958, Ser. No. 752,897
11 Claims. (Cl. 285—18)

This invention relates to a flexible exhaust manifold to exhaust conduit couplings, and more particularly to a flexible spring loaded exhaust coupling having a ball and socket joint and a means for obtaining the proper resilient preload on the parts of the joint.

In exhaust couplings of the past, there has been a great deal of difficulty in obtaining a flexible joint which is rigid enough to withstand high exhaust temperatures and compressive loading. The usual coupling employs a spherical internal surface on the exhaust manifold and a mating external spherical surface on the exhaust conduit, the conduit being received in the manifold. Since the conduit is generally of sheet metal or thin walled tubing, there is a great tendency of the sheet metal ball to deform under exhaust heat and compressive load. A further disadvantage of the well known exhaust couplings is the difficulty in assembling the coupling to properly preload the coupling and provide a flexible joint. Since the exhaust coupling is generally in a "hard to get at" place, there have been a great number of problems involved in attempting to properly tension the various parts of the joint.

The structure in which this invention is embodied comprises an exhaust manifold and a tubular conduit connected by a ball and socket type joint and a spring loaded pressure plate retaining the socket-formed conduit in proper engagement with the ball-formed manifold. A fusible washer is disposed between the spring and the pressure plate to allow tensioning of the spring on assembly. When exhaust gases flow through the coupling the heat therefrom will melt the washer and allow the spring to expend to its normal operating length.

Since the ball portion of the joint is formed on the manifold member, the joint becomes much stronger, reducing the tendency of deformation due to exhaust temperatures or compressive loads. The socket portion of the joint is rigidly supported from both sides, preventing metal fatigue and high temperature metallurgical disturbances. The joint is held together by spring means which retain the parts in engagement under the proper operating force and there is no problem in providing the proper compressive force on the spring during assembly to keep the joint in sliding fluid tight relation.

The resulting exhaust coupling is a superior coupling in efficiency, ease of manufacture, cost, and conserves operator time and effort in assembly.

Figure 1:
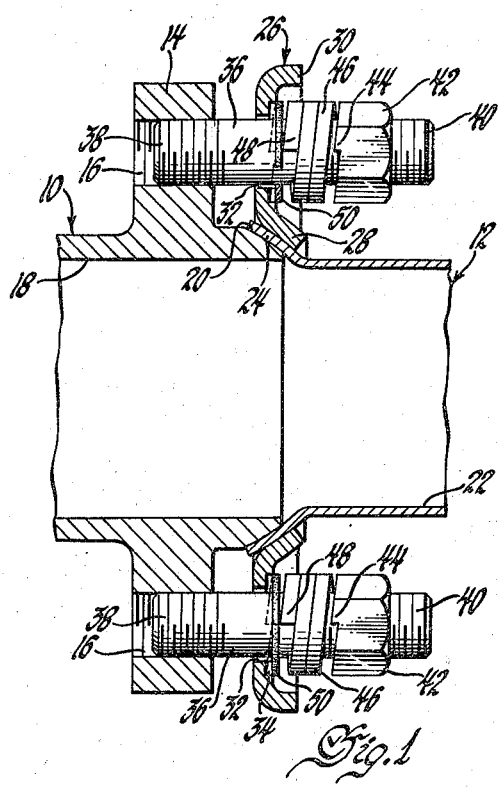
FIGURE 1 is an elevational view of the exhaust coupling embodying the invention with parts broken away and in section to show the joint at the end of the assembly thereof.
Figure 2:
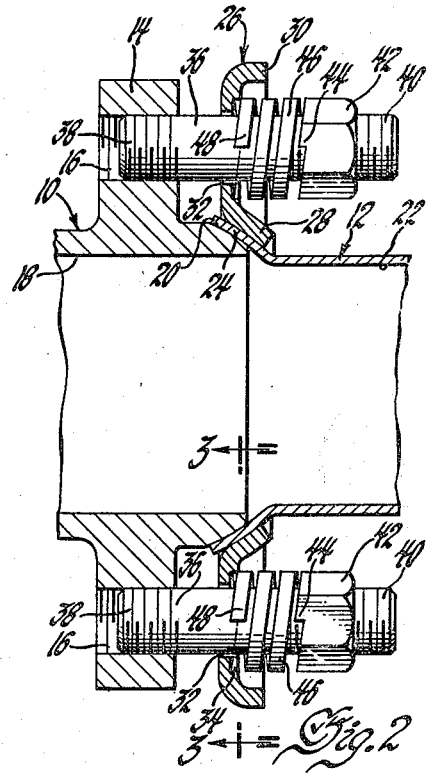
FIGURE 2 is a view of the joint illustrated in FIGURE 1 with parts broken away and in section to show the location of the parts after the fusible washer has been melted.
Figure 3:
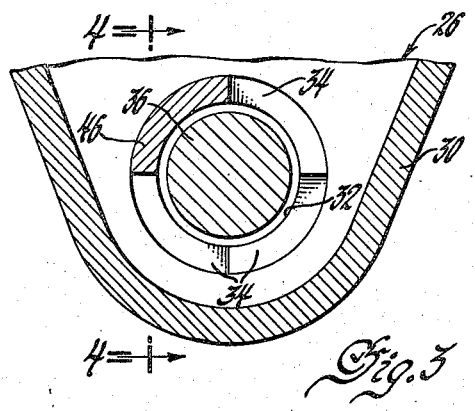
FIGURE 3 is a view of a portion of the joint of FIGURE 2 with parts broken away and in section, taken substantially along the line 3—3 of FIGURE 2 and looking in the direction of the arrows.
Figure 4:
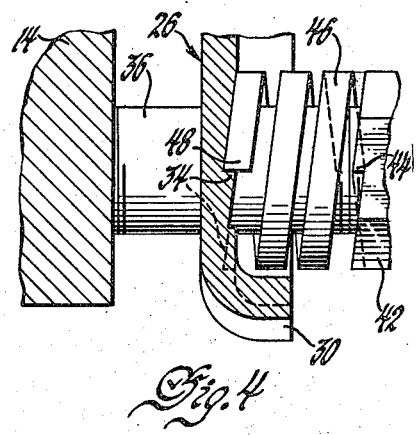
FIGURE 4 is a sectional view of a portion of the joint shown in FIGURE 2, taken substantially along the line 4—4 of FIGURE 3 and looking in the direction of the arrows.

Referring more particularly to the drawings, FIGURE 1 shows the exhaust coupling during its assembly process, and FIGURE 2 shows the exhaust coupling after the exhaust gases have been allowed to pass through the coupling and melt the fusible washer, completing the assembly. An exhaust manifold, illustrated generally by the numeral 10, is suitably connected to an engine, not shown, and extends toward the exhaust conduit, illustrated generally by the numeral 12. A flange 14 formed near the end of the manifold member 10 has internally threaded holes 16 formed therein to receive the securing portion of the coupling. An exhaust passage 18 formed through the manifold extends into and communicates with the exhaust conduit 12. An external spherical surface 20 is formed on the end of the exhaust manifold and, though the surface may be of any arcuate form, it is preferred that it be spherical. The spherical surface 20 provide a ball seat for the ball and socket coupling.

The exhaust conduit 12 has a passage 22 therethrough which communicates with the passage 18 of the exhaust manifold 10. An outwardly turned arcuate flange 24 is formed on the end of the exhaust conduit and, though it may be of any arcuate shape in section to correspond with the surface of the manifold, it is preferred that it be spherical and concentric with the spherical surface 20 of the manifold member. The arcuate flange 24 provides a socket to receive the ball portion 20 of the manifold and to provide a sliding engagement of the conduit with the manifold and still retain a relatively fluid tight coupling. The exhaust condut 12 extends toward the rear of the installation where it is opened to the atmosphere or other receiving means.

A pressure plate, illustrated generally by the numeral 26, retains the spherical flange 24 of the conduit 12 in engagement with the spherical surface 20 of the exhaust manifold 10. An inwardly turned flange 28, formed in the pressure plate 26, cooperates with the flange 24 of the exhaust conduit and bears against the conduit to retain the conduit in engagement with the manifold. Again, the configuration of the surface 28 is preferably spherical but may be of any arcuate shape so long as it cooperates with the surface of the flange 24 of the conduit. An annular flange 30 is formed at the outer edge of the pressure plate 26 to provide the proper rigidity and strength for the pressure plate. A plurality of openings 32 are provided in the pressure plate for passage of the securing means therethrough. In the opposite face of the pressure plate from the exhaust manifold 10, and adjacent the openings 32, a plurality of ratchet teeth 34 are formed, the purpose of which will be later described.

In order to secure the pressure plate and the exhaust conduit against the exhaust manifold, bolts, such as the double ended bolts 36, pass through the openings 32 in the pressure plate and into the threaded holes 16 in the exhaust manifold 10. The external threads 38 communicate with the threaded holes 16 in the manifold and the threaded portions 40 at the opposite ends of the bolt members 36 receive the nuts 42. The nuts are also provided with a plurality of ratchet teeth 44, the purpose of which will be hereinafter described.

The resilient means biasing the pressure plate against the exhaust conduit may take the form of the springs 46 received about the threaded bolt 36 and between the pressure plate 26 and the nut 42. The springs may be of any conventional form but it is preferred that they are formed of square wire and coiled in a counterclockwise direction. The squared end of the spring, such as the end 48, is receivable in any of the ratchet teeth 34 formed in the pressure plate, and the opposite end of the spring is receivable in any of the ratchet teeth 44 formed in the adjacent end of the nut 42. The purpose of the ratchet teeth and the square spring member is to provide a proper seat for the spring member in the pressure plate and the nut, and to lock the nut when the spring ends engage the ratchet teeth in the two members.

In assembling the exhaust coupling, fusible washers 50 are placed between the pressure plate 26 and the springs 46. The fusible washers are formed of a plastic material, such as polystyrene, polyethylene, cellulose acetate, of the like, that has a low melting point and a material that will be fused by the normal heat of the exhaust gases passing through the coupling. As shown in FIGURE 1, the fusible washers 50 allow the springs 46 to be fully compressed during assembly by the nuts 42 and, referring to FIGURE 2, it may be seen that when the washers are melted the springs 46 will expand to their proper operating length.

The operation and assembly process of the coupling is as follows: The exhaust manifold 10 receives the exhaust coupling 12 which has the pressure plate 26 placed thereon. The bolts 36 are passed through the opening 32 in the pressure plate and engaged in the threaded openings 16 of the flange 14 of the exhaust manifold. The fusible washers 50 are then placed over the bolts and brought into abutting relation with the pressure plate 26. The springs 46 are placed over the bolts to abut the fusible washers 50. The nuts 42 are received on the bolts 36 and tightened down until the springs 46 are fully compressed and their convolutions abut one another and the end 48 abuts the fusible washers 50. The exhaust gases are then allowed to pass through the coupling, melting the fusible washers 50 and allowing the springs 46 to expand to their proper length for the correct operating compressive force against the pressure plate. The exhaust conduit 12 is then secured in relatively fluid tight sliding engagement with the spherical surface 20 of the manifold 10.

Figure 5:
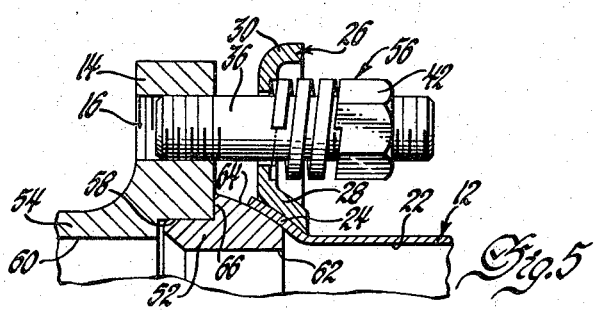
FIGURE 5 is a fragmentary view of an exhaust coupling with parts broken away and in section and showing a modification of the joints of FIGURES 1 and 2.

A modification of the above described structure is shown in FIGURE 5. Instead of forming the exhaust manifold with the spherical surface, an insert 52 is received in the manifold 54. The manifold has a flange 14 with the same threaded openings 16 to receive the coupling securing means, illustrated generally by the numeral 56. The insert 52 is received in the opening 58, formed in the manifold 54 adjacent the exhaust passage 60. An opening 62 in the insert 52 communicates with the passage 60 to convey exhaust gases from the manifold to the conduit 12 and the passage 22 therethrough. A spherical surface 64 is formed on the insert 52 which forms the ball member of the coupling. The spherical surface is received by the flange 24 of the exhaust conduit 12. A shoulder 66 formed on the insert 52 retains the insert in the proper position adjacent the manifold 54. The assembly and operation of the manifold as shown in FIGURE 5 is the same as that above described.

We claim:

1. A flexible coupling comprising a first member having a passage therethrough and an annular surface on one end thereof, a second member having a passage therethrough communicating with said passage in said first member, said second member having an outwardly turned arcuate flange slidingly engaging said one end of said first member, a pressure plate disposed about said second member and retaining said flange in sliding engagement with said one end of said first member, means including a spring connecting said pressure plate to said first member for proper engagement of said pressure plate and said first and second members, and a fusible washer disposed between said spring and said pressure plate to retain said spring in a fully compressed position and having a melting point substantially lower than the remainder of the coupling elements and adapted to be melted by fluid flow through said coupling to allow said spring to expand into proper operating length and retain said coupling in fluid tight relation.

2. A resilient exhaust coupling comprising a manifold having a tube receiving spherical surface formed thereon, a tube having an outwardly turned arcuate flange slidingly engaging said spherical surface on said manifold, a pressure plate disposed about said flange to retain said tube in engagement with said manifold, bolt means extending through said pressure plate and engaging said manifold and having a compressed spring disposed thereon, and a fusible washer disposed between said spring and said pressure plate to retain said spring in a fully compressed position and having a melting point substantially lower than the remainder of the coupling elements and adapted to be melted by exhaust gas flow through said coupling to permit said spring to expand to its operating length and resiliently retain said pressure plate and said tube and said manifold in operative engagement.

3. An exhaust coupling comprising a manifold, a flange formed from said manifold and radially extending therefrom, a spherical surface formed on the end of said manifold adjacent said flange, an exhaust conduit receivable on said manifold and having an inner surface cooperating with said spherical surface on said manifold, a pressure plate receivable about said conduit adjacent said manifold to retain said conduit in engagement with said manifold, bolt means passing through said pressure plate and threadedly received in said manifold flange, nut means received on said bolt means on the opposite side of said pressure plate from said flange, a spring received about said bolt means between said pressure plate and said nut means, and a fusible washer having a melting point substantially lower than the remainder of the coupling elements and disposed about said bolt means and between said pressure plate and said spring and maintaining said spring in compressed condition, said fusible washer being adapted to be melted by the transfer of heat from the exhaust gases flowing through said coupling to allow said spring to expand from fully compressed condition and to seat on said pressure plate and bias said conduit and said manifold in proper operating engagement.

4. The exhaust coupling set forth in claim 3 wherein said pressure plate is provided with a plurality of ratchet teeth to engage the end of said spring received against said pressure plate and properly seat said spring in nonrotatable position relative to said bolt means.

5. The exhaust coupling defined in claim 3 wherein said nut means is provided with a plurality of ratchet teeth adjacent said spring to engage the end of said spring acting thereagainst and properly seat said spring in nonrotatable position relative to said bolt means.

6. A flexible coupling comprising a first member having a passage therethrough, an insert receivable in said first member and having a portion thereof formed to provide an external spherical surface and projecting from said first member, said insert having a passage therethrough communicating with said passage in said first member, a second member having a passage therethrough communicating with said passages in said first member and in said insert, said second member having an outwardly turned arcuate flange slidingly engaging said projecting portion of said insert, a pressure plate disposed about said second member and retaining said flange in sliding engagement with said projecting portion of said insert, means including a spring connecting said pressure plate to said first member for proper engagement of said pressure plate and said first and second members and said insert, and a fusible washer disposed between said spring and said pressure plate to retain said spring in a fully compressed position and having a melting point substantially lower than the remainder of the coupling elements and adaptable to be melted by fluid flow through said coupling to allow said spring to expand into proper operating length and bias said first and second members and said insert into fluid tight sliding engagement.

7. A method of assembling a flexible exhaust coupling including a manifold having a flange radially extending therefrom, a spherical surface on the end adjacent said flange, a tubular conduit having an outwardly turned arcuate flange cooperating with said spherical flange, and a pressure plate receivable about said flange and connected to said manifold flange; said method of assembly comprising the steps of placing said pressure plate over said arcuate flange on said conduit, placing said conduit and said pressure plate in engagement with said spherical surface of said manifold, placing a threaded member through said pressure plate and into said manifold flange, placing a fusible washer over said threaded member and against said pressure plate, placing a spring over said threaded member and abutting said fusible washer, placing a nut on said threaded member and rotating said nut to fully compress said spring against said fusible washer, and melting said fusible washer to allow said spring to expand to its operating position and properly bias said pressure plate and said conduit into fluid tight sliding engagement with said manifold.

8. A method of assembling an exhaust coupling including a manifold, an insert receivable in said manifold and having an external spherical surface projecting from said manifold, a conduit having an outwardly turned arcuate flange engaging said insert, and a pressure plate receivable about said arcuate flange and adapted to be connected to said manifold; said method of assembly comprising the steps of placing said pressure plate over said conduit, placing said insert in said manifold, placing said pressure plate and said conduit into engagement with the projecting spherical surface of said insert, placing a threaded member through said pressure plate and into said manifold, placing a fusible member over said threaded member and abutting said pressure plate, placing a spring over said threaded member and abutting said fusible member, threading a nut on said thread member to fully compress said spring against said fusible member, and melting said fusible member to permit said spring to expand to its proper operating length to bias said pressure plate and said conduit into fluid tight sliding engagement with said insert and to retain said said insert in said manifold.

9. A method of assembling a fluid carrying coupling having ball and socket members spring biased together for substantially fluid tight sliding engagement by spring means engaged between one of said members and an adjustable abutment means secured to the other of said members comprising the steps of placing said ball and socket members in engagement with each other, providing said spring means with a fusible washer and engaging them with one of said members and said adjustable abutment means with said spring means held in a fully compressed condition, and melting said fusible washer by fluid flow through said coupling to permit said spring to expand to the proper operating length to retain said ball and socket members in sliding engagement.

10. The combination comprising a first member, a second member to be held against said first member with a predetermined pressure, a threaded bolt extending through said first member and threaded into said second member, said bolt having radially extending abutment means thereon, a helical spring encircling said bolt having a diameter less than said abutment means and trapped beneath said abutment means, and an unyielding rigid heat dissipable washer encircling said bolt in engagement with the end of said spring remote from said abutment means and with said first member and resisting compressive deformation, said spring being substantially in a fully compressed position between said abutment means and said washer, said heat dissipable washer being adapted to be dissipated by subsequent application of heat whereby to leave said spring expanded between said abutment means and said first member to hold said first member against said second member with said predetermined pressure.

11. The method of assembling first and second parts under predetermined pressure which comprises placing said parts in juxtaposition, providing a threaded member having a radially extending surface, placing a helical spring on said threaded member, placing a heat dissipable washer on said threaded member and abutting said spring, placing said threaded member through said first part and into said second part, axially advancing said radially extending surface to fully compress said spring against said washer, heating said heat dissipable washer to dissipate the same to allow said spring to expand to hold said parts under said predetermined pressure.

References Cited by the Examiner

UNITED STATES PATENTS

| | | | |
|---|---|---|---|
| 720,632 | 2/03 | Spena et al. | 151—13 |
| 969,422 | 9/10 | Tanner | 285—334.5 |
| 1,202,502 | 10/16 | Forth | 285—268 |
| 1,733,457 | 10/29 | Hannahs | 285—268 |
| 1,953,575 | 4/34 | Van Oberstadt | 29—423 |
| 1,956,846 | 5/34 | Williams | 151—41 |
| 2,048,388 | 7/36 | Johnsen | 285—2 |
| 2,795,443 | 6/57 | Gratzmuller | 85—50 |

FOREIGN PATENTS 305,478 12/29 Great Britain.
610,869 10/48 Great Britain.

EDWARD C. ALLEN, *Primary Examiner*.

ARTHUR B. MILLER, CARL W. TOMLIN, *Examiners*.

UNITED STATES PATENT OFFICE
CERTIFICATE OF CORRECTION

Patent No. 3,188,115 June 8, 1965

Leonard M. Morrish et al.

It is hereby certified that error appears in the above numbered patent requiring correction and that the said Letters Patent should read as corrected below.

Column 3, line 14, for "of" read -- or --; line 62, after "annular" insert -- arcuate --.

Signed and sealed this 15th day of February 1966.

(SEAL)
Attest:

ERNEST W. SWIDER
Attesting Officer

EDWARD J. BRENNER
Commissioner of Patents